United States Patent
Okada et al.

(10) Patent No.: US 6,980,509 B1
(45) Date of Patent: Dec. 27, 2005

(54) TRANSMITTING DEVICE AND METHOD, AND PROVIDING MEDIUM

(75) Inventors: Takahiro Okada, Saitama (JP); Yasunari Ikeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/914,716

(22) PCT Filed: Mar. 6, 2000

(86) PCT No.: PCT/JP00/01349

§ 371 (c)(1),
(2), (4) Date: Jan. 22, 2002

(87) PCT Pub. No.: WO00/52861

PCT Pub. Date: Sep. 8, 2000

(30) Foreign Application Priority Data

Mar. 4, 1999 (JP) .................................. 11-057468

(51) Int. Cl.[7] .............................................. H04J 11/00
(52) U.S. Cl. ..................................... 370/208; 370/211
(58) Field of Search .............................. 370/203, 204, 370/206, 208, 209, 210, 211, 212, 335, 342, 370/441, 503, 507, 480, 481, 294, 422; 375/259, 375/260, 362, 365, 364, 395

(56) References Cited

U.S. PATENT DOCUMENTS 6,169,768 B1 * 1/2001 Okada et al. ............... 375/316
6,563,881 B1 * 5/2003 Sakoda et al. .............. 375/260
6,816,555 B2 * 11/2004 Sakoda ....................... 375/260
6,856,590 B2 * 2/2005 Okada et al. ............... 370/208

FOREIGN PATENT DOCUMENTS

| EP | 0 786 890 A2 | 7/1997 |
| JP | 7-283801 | 10/1995 |
| JP | 7-321765 | 12/1995 |
| JP | 9-8774 | 1/1997 |
| JP | 9-205411 | 8/1997 |
| JP | 10-336140 | 12/1998 |
| JP | 11-17644 | 1/1999 |

* cited by examiner

*Primary Examiner*—Dang Ton
*Assistant Examiner*—Phuc Tran
(74) *Attorney, Agent, or Firm*—Finnegan, Henderson, Farabow, Garrett & Dunner, L.L.P.

(57) ABSTRACT

A transmission apparatus which prevents adversely affects from an adjacent channel even without provision of a guard band. An information sequence 1 input to a mapping unit 21-1 of the transmission apparatus is mapped onto predetermined signal points by QAM modulation, etc. and output to a frequency converter 22-1. The frequency converter 22-1 converts the frequency according to a center frequency of an input signal and outputs the result to a multiplexer 23. The other data series are processed in the same way as the data series 1 are output to the multiplexer 23. The multiplexer 23 multiplexes a plurality of input signals, while an IFFT processor 24 performs an inverse Fourier transform on the multiplexed signals all at once. The inverse Fourier transformed signal is quadrature-modulated by a quadrature modulator 26, converted to the RF band signal by the frequency converter 28, and transmitted from an antenna 30.

7 Claims, 6 Drawing Sheets

FREQUENCY CONVERTER 22-1

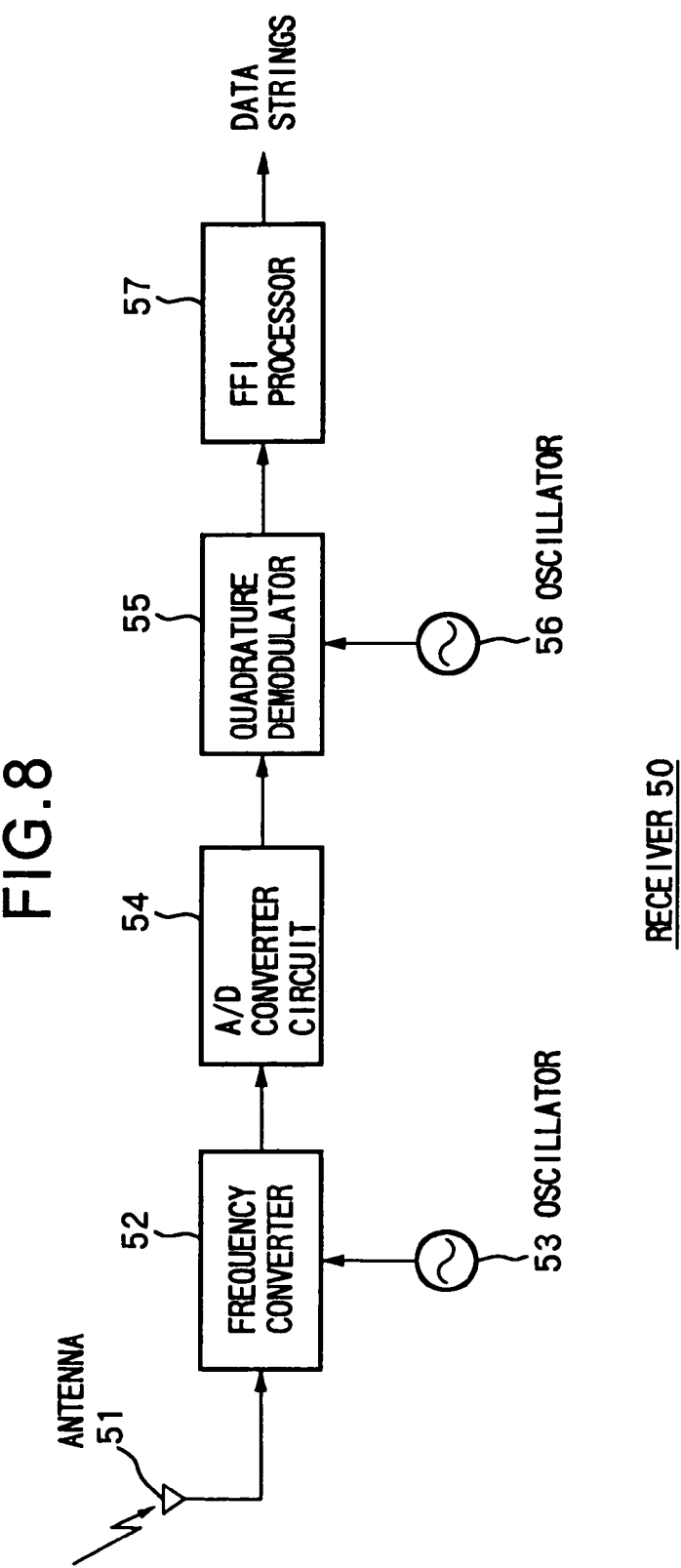

TRANSMITTING DEVICE AND METHOD, AND PROVIDING MEDIUM

TECHNICAL FIELD

The present invention relates to a transmission apparatus and method and to a providing medium which provides the method, more particularly to a transmission apparatus and method and a providing medium thereof which enables a signal of a desired channel to be demodulated without being affected by adjacent channels at a receiver side even without providing of a guard band.

BACKGROUND ART

An OFDM (orthogonal frequency division multiplexing) transmission system is known as a transmission system suitable for digital transmission using a terrestrial wave due to its tolerance to multipath interference.

When transmitting using the OFDM transmission system, the channels are arranged with a predetermined frequency intervals (guard bands) between them, for example, as shown in FIG. 1, so as to prevent the interference between adjacent channels. In FIG. 1, an example is shown where the provision (setting) is made guard bands between the channels when the center frequency of a channel 1 (ch1) is $f_1$, a center frequency of channel 2 (ch2) is $f_2$, and a center frequency of channel 3 (ch3) is $f_3$.

FIG. 2 is a block diagram of the configuration of a transmitter 1 transmitting a signal provided with guard bands illustrated in FIG. 1. The transmitter 1 shown in FIG. 2 shows the configuration in the case of transmitting three channels worth, ch1 to ch3, of signals.

An information sequence 1 of ch1 input to a mapping unit 2-1 is assigned to modulated signal points of a predetermined coding scheme, for instance, QPSK (quadrature phase shift keying) and 16 QAM (quadrature amplitude modulation), and is output to an IFFT (Inverse Fast Fourier Transform) processor 3-1. The IFFT processor 3-1 performs an inverse Fourier transform on the input modulated signal points and outputs the result to a guard interval inserter 4-1. The guard interval inserter 4-1 inserts a guard interval to the input signal and outputs the result to a quadrature modulator 5-1. The quadrature modulator 5-1 uses a carrier wave of a frequency $f_{IF}$ generated at an oscillator 6-1 to quadrature-modulate the input signal and outputs the result to a frequency converter 7-1. The frequency converter 7-1 multiplies a carrier wave with a frequency $f_1+f_{IF}$ which is the sum of the center frequency $f_1$ of the channel 1 and the intermediate frequency $f_{IF}$ generated at the oscillator 8-1 with the input signal, converts the result to an RF band signal of the center frequency $f_1$ of the channel 1, and makes the result be transmitted from an antenna 9-1.

An information sequence 2 of ch2 is input to a mapping unit 2-2, while an information sequence 3 of ch3 is input to mapping unit 2-3. These are processed to the same processing as the above-mentioned information sequence 1 by corresponding devices, whereby they are made into an RF band signal of the center frequency $f_2$ and an RF band signal of the center frequency $f_3$.

The resultant three channels' worth of signals are, as shown in FIG. 1, provided with guard bands between the adjacent channels, and thus, when detecting a desired channel at a receiving side, the detection of the desired channel is free from the affection of its adjoining channels.

As described above, the guard band is provided to prevent the desired channel from being affected by its adjoining channels, but, the provision of the guard band results in a low efficiency of frequency utilization and it is not desirable from the viewpoint of the effective use of frequency. However, if the guard band is not provided or the distance is made narrower, it suffers from the disadvantages that the adversely affection from the adjoining channels may occur and the S/N at the time of reception may deteriorates.

DISCLOSURE OF THE INVENTION

The present invention was made in consideration of the above circumstance and has as its object to improve the efficiency of frequency utilization by transmitting a signal enabling a desired channel to be demodulated at a receiving side without being adversely affected by adjoining channels and without the provision of a guard band.

A transmission apparatus according to the present invention is characterized by comprising N number of assigning means for assigning N number of channel data to signal points on a complex plane; N number of converting means for converting the frequency of N number of signal points output from the N number of assigning means based on a center frequency of each channel; a multiplexing means for multiplexing the signals output from the N number of converting means; a modulating means for modulating the signal multiplexed by the multiplexing means to an OFDM signal; and a transmitting means for converting the OFDM signal to an RF band signal and transmitting the same.

The transmission method of the present invention is characterized by comprising: an assigning step of assigning N number of channel data to signal points on a complex plane; a converting step of converting the frequency of N number of signal points obtained in the assigning step based on a center frequency of each channel; a multiplexing step of multiplexing the signals obtained in the converting step; a modulating step of modulating the signal multiplexed in the multiplexing step to an OFDM signal; and a transmitting step of converting the OFDM signal to an RF band signal and transmitting it.

The providing medium which provides the transmission method of the present invention is characterized by providing a computer readable program for making a transmission apparatus execute processing comprising: an assigning step of assigning N number of channel data to signal points on a complex plane; a converting step of converting the frequency of N number of signal points obtained in the assigning step based on a center frequency of each channel; a multiplexing step of multiplexing the signals obtained in the converting step; a modulating step of modulating the signal multiplexed in the multiplexing step to an OFDM signal; and a transmitting step of converting the OFDM signal to an RF band signal and transmitting it.

In the transmission apparatus, transmission method, and providing medium of the present invention, N number of channel data are assigned to signal points on a complex plane; the signal points are converted in frequency based on a center frequency of each channel; and the N number of signals are multiplexed and the result modulated to an OFDM signal.

According to the present invention, there is provided a communication system comprised of a transmitter and a receiver connected wirelessly through a wireless channel, wherein (a) the transmitter comprises a plurality of assigning means for respectively and independently assigning data of a plurality of channels to signal points on a complex plane, a plurality of frequency converting means for converting the frequency of a plurality of signal points output from the plurality of assigning means based on a center frequency of each channel, a multiplexing means for multiplexing a plurality of signals output from the plurality of frequency converting means, a modulating means for modulating the signal multiplexed by the multiplexing means to an OFDM signal, and a transmitting means for converting the OFDM signal to an RF band signal and transmitting the same, and (b) the receiver comprises a receiving means for receiving a signal transmitted from the transmitting means of the transmission apparatus; a frequency converting means for converting the signal received in the receiving means to a signal of an intermediate frequency; a frequency signal selecting means for extracting from the frequency converted signal only a frequency corresponding to the selected channel; a quadrature demodulating means for quadrature-demodulating the selected frequency signal by using an intermediate frequency signal and extracting an orthogonal I-signal and Q-signal defined in a complex coordinate system; a demodulating means for demodulating the quadrature demodulated signal to a time-series signal.

BRIEF DESCRIPTION OF THE DRAWINGS

FIG. 8 is a block diagram of a configuration of a receiver as an embodiment according to the present invention.

BEST MODE FOR CARRYING OUT THE INVENTION

Below, embodiments of the present invention will be given with reference to the accompanying drawings.

Figure 1:
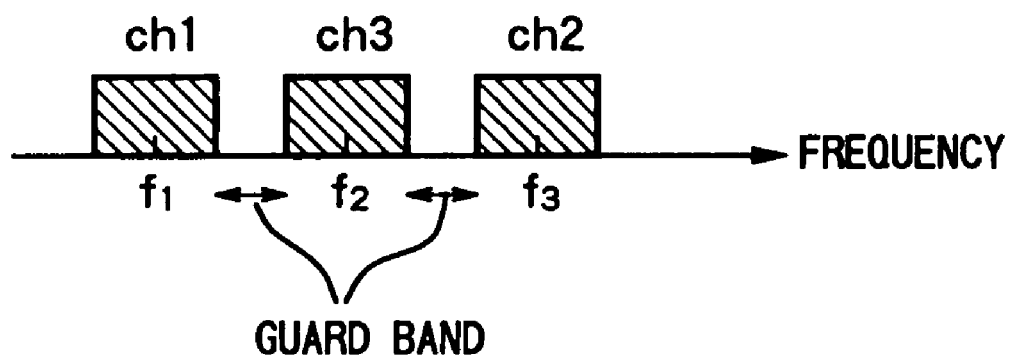
FIG. 1 is a view explaining a guard band.
Figure 2:
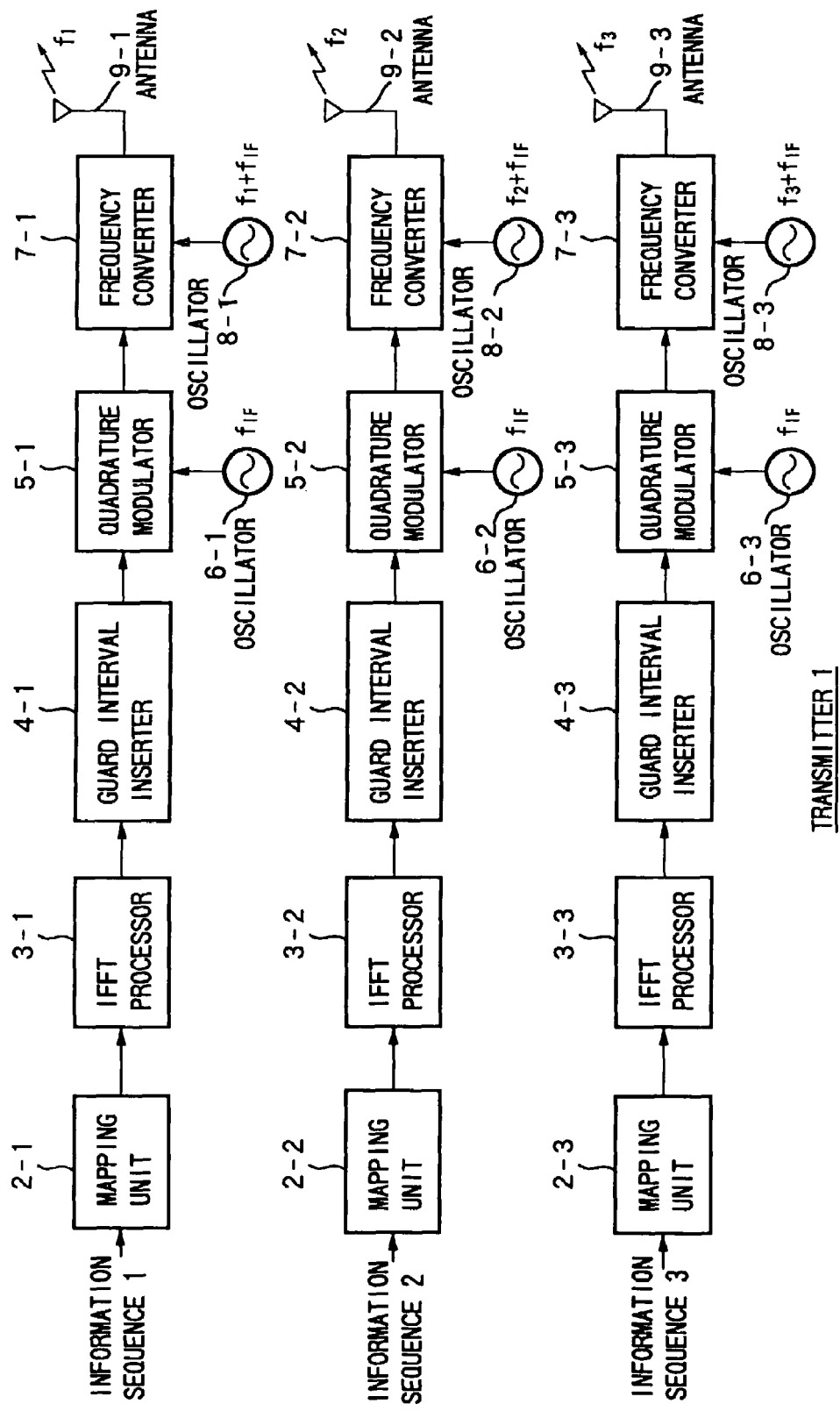
FIG. 2 is a block diagram of a configuration of an example of a conventional transmitter.
Figure 3:
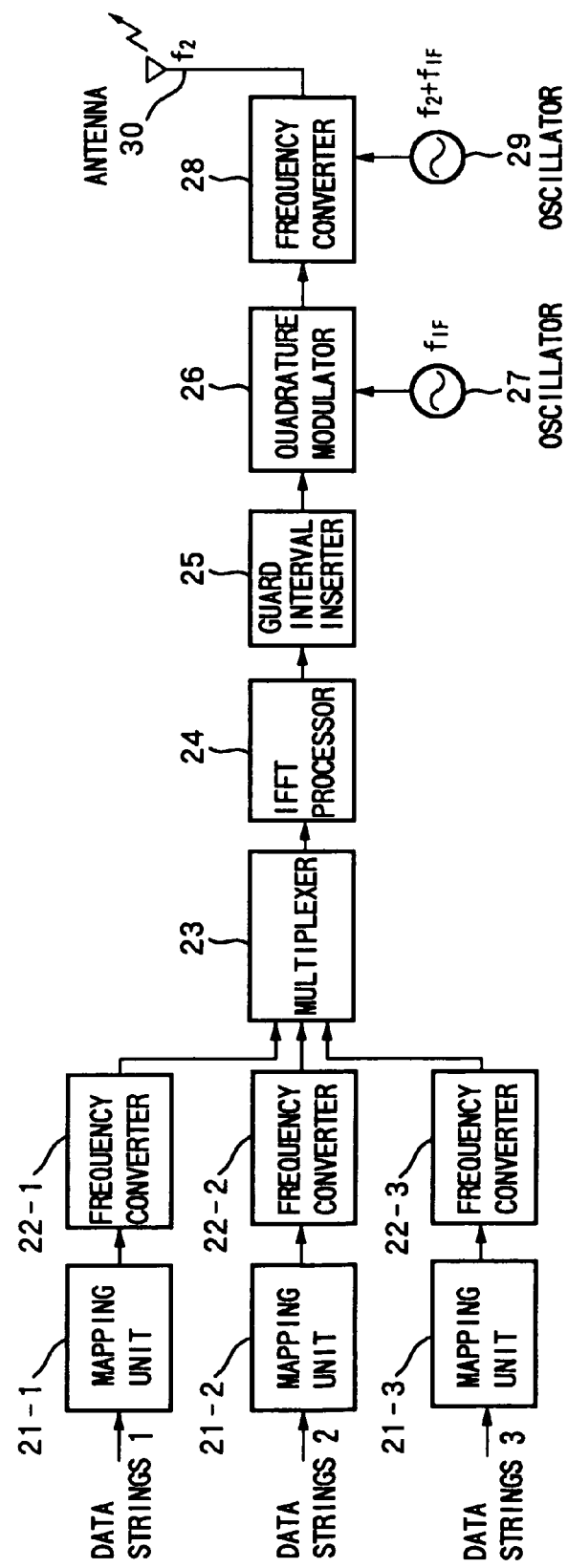
FIG. 3 is a block diagram of a configuration of an example of a transmitter as an embodiment according to the present invention.

FIG. 3 is a block diagram of a configuration of a transmitter as an embodiment according to the present invention. The configuration of a transmitter 20 shown in FIG. 3 is a configuration where a number of multiple channels are three.

The transmitter 20 is provided with a first series circuit of a mapping unit 21-1 and a frequency converter 22-2, a second series circuit of a mapping unit 21-2 and a frequency converter 22-2, and a third series circuit of a mapping unit 21-3 and a frequency converter 22-3, in parallel. Further, the transmitter 20 comprises a multiplexer 23, an IFFT processor 24, a guard interval inserter 25, a quadrature modulator 26, a first local oscillator 27, a frequency converter 28, and a second local oscillator 29.

Figure 4:
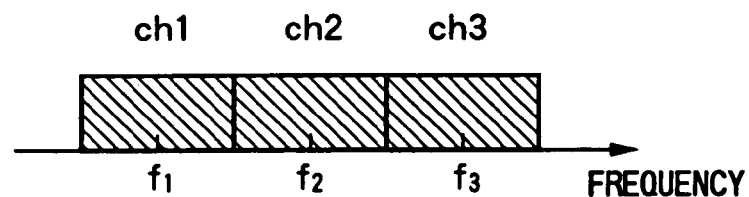
FIG. 4 is a view explaining a signal transmitted from the transmitter of FIG. 3.

As shown in FIG. 4, a signal output from the transmitter 20 is comprised of channel 1 (ch1) to channel 3 (ch3) signals arranged without providing guard bands. The center frequencies of ch1 to ch3 are defined as $f_1$, $f_2$, and $f_3$, respectively.

The mapping unit 21-1 receives an information sequence 1 of ch1, the mapping unit 21-2 receives an information sequence 2 of ch2, and the mapping unit 21-3 receives an information sequence 3 of ch3. The mapping units 21-1 to 21-3 respectively encode the input information series 1 to 3 in accordance with a predetermined coding scheme and respectively output the coded results to the corresponding frequency converters 22-1 to 22-3. The detailed description of the mapping processings in the mapping units 21-1 to 21-3 will be described later. The frequency converters 22-1 to 22-3 convert the frequencies of the input signals in a manner mentioned below and output the results to the multiplexer 23.

The multiplexer 23 multiplexes the signals input from the frequency converters 22-1 to 22-3 and outputs the result to the IFFT processor 24.

The IFFT processor 24 performs an inverse Fourier transform (OFDM modulation) on the input multiplexed three channels worth of signals all together and outputs the result to the guard interval inserter 25.

The guard interval inserter 25 inserts guard intervals to the input signals.

Figure 5:
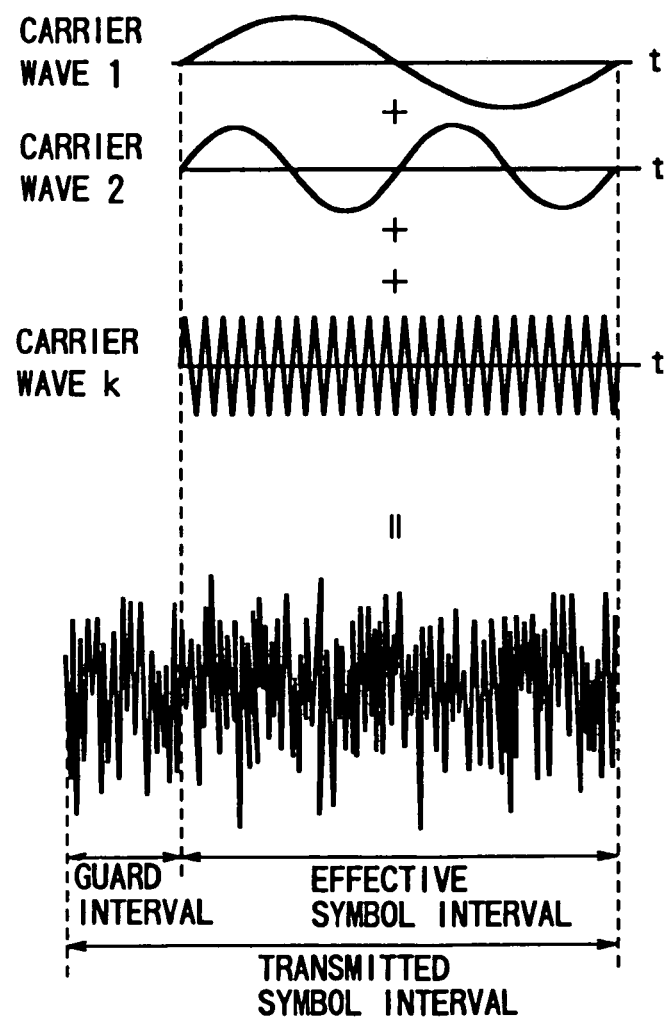
FIG. 5 is a view explaining a guard interval.

In an OFDM modulation scheme, as shown in FIG. 5, a plurality of carrier waves 1 to k as modulated waves modulated by using for instance 16 QAM etc. are added to produce transmission signals.

An interval of a transmission symbol is comprised of the guard interval and effective symbol interval. This guard interval is a signal interval provided for reducing the affect of the multipaths (ghost or fading) and is repeated by a recurrent part of the signal waveform in the effective symbol interval.

The signal output from the guard interval inserter 25 is input to the quadrature modulator 26. The quadrature modulator 26 quadrature-modulates the input signal using a carrier wave with an intermediate frequency $f_{IF}$ generated at the oscillator 27 and outputs it to the frequency converter 28.

The frequency converter 28 multiplies a carrier wave with a frequency $(f_2+f_{IF})$ which is the sum of the center frequency $f_2$ of the channel 2 and the intermediate frequency $f_{IF}$ generated at the oscillator 29 with the input signal to convert it to an RF band signal of the center frequency $f_2$ of the channel 2.

The signal with the center frequency $f_2$ multiplexed and comprised of the three channels' worth of signals generated in this manner is transmitted from an antenna 30.

The information sequence 1 of ch1 is mapped onto signal points in an orthogonal coordinate space defined by an orthogonal I-axis and Q-axis by the mapping unit 21-1 in accordance with a coding scheme such as QPSK or 16 QAM. The signal of the mapped information series 1 is output to the frequency converter 22-1.

The frequency converter 22-1 converts the frequency of the input signal in accordance with the center frequency of the channel, in this case, since the channel is ch1, in accordance with the center frequency $f_1$.

Figure 6:
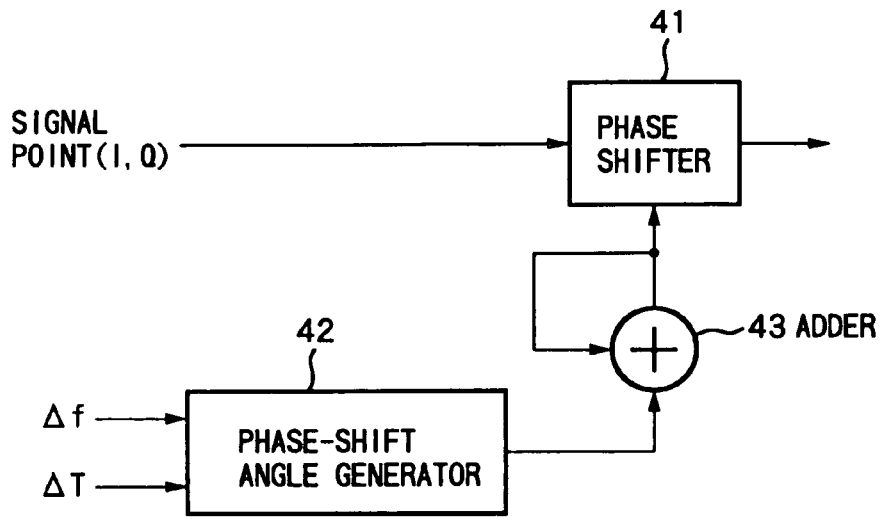
FIG. 6 is a block diagram of a configuration of a frequency converter in FIG. 3.

FIG. 6 is a block diagram of the configuration of the frequency converter 22-1. Note that since the frequency converters 22-2 and 22-3 are made the same in configuration of the frequency converter 22-1 and are similar in operation as well, the frequency converter 22-1 will be explained as a typical example. The coordinates of the signal point output from the mapping unit 21-1 are expressed as (I,Q), the frequency shift is expressed as $\Delta f$, and a guard interval length is expressed as $\Delta T$. The frequency shift $\Delta f$ is the difference between the center frequency of each channel and the center frequency of the three channels to be multiplexed. For example, the frequency shift $\Delta f$ of the frequency converter 22-1 for the channel 1 is $f_1-f_2$, the frequency shift $\Delta f$ of the frequency converter 22-2 for the channel 2 is $f_2-f_2$ (=0), and the frequency shift $\Delta f$ of the frequency converter 22-3 for the channel 3 is $f_3-f_2$.

The signal point (I,Q) output from the mapping unit 21-1 is input to a phase shifter 41, and the frequency shift Δf and the guard interval length ΔT are input to a phase-shift angle generator 42. The phase-shift angle generator 42 generates a phase-shift angle θ based on the following equation (1):

Phase-shift angle θ=$f(\Delta f, \Delta T)=2\pi\Delta f(T+\Delta T)$     (1)

In equation (1), a symbol T is the effective symbol interval (duration) of the OFDM signal. Therefore, (T+ΔT) is the interval of the transmission symbol.

The phase-shift angle θ generated by the phase-shift angle generator 42 is output to an adder 43 and cumulatively added therein. The adder 43 adds the input phase-shift angle θ and an earlier phase-shift angle θ earlier by one OFDM signal (one OFDM symbol) to generate the cumulatively added phase shift angle θ' and output the same to the phase-shifter 41. The phase shifter 41 substitutes the phase-shift angle θ' input from the adder 43 into the following equation (2) to shift the phase (phase-shift) of the signal point (I,Q) and to thereby calculate a frequency-converted signal point (I', Q').

$$\begin{pmatrix} I' \\ Q' \end{pmatrix} = \begin{pmatrix} \cos\theta' & -\sin\theta' \\ \sin\theta' & -\cos\theta' \end{pmatrix} \begin{pmatrix} I \\ Q \end{pmatrix}. \quad (2)$$

The signal converted in frequency by the frequency converter 22-1 is output to the multiplexer 23.

The information sequence 2 is processed in the same way as the above information sequence 1 by the mapping unit 21-2 and the frequency converter 22-2, while the information series 3 is processed by the mapping unit 21-3 and the frequency converter 22-3 in the same way as the information sequence 1, then the results are input to the multiplexer 23.

Figure 7:
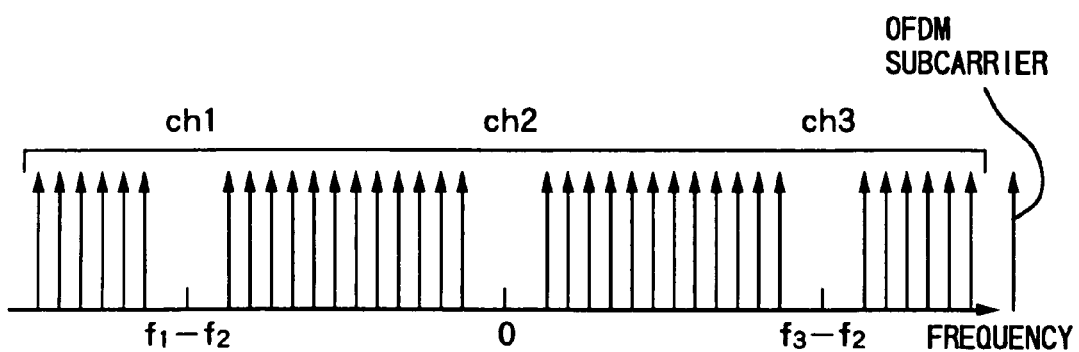
FIG. 7 is a view explaining a subcarrier of an OFDM.

The multiplexer 23 multiplexes the signals input from the frequency converters 22-1 to 22-3 in accordance with the respective channel arrangements. The three channels' worth of signals multiplexed by the multiplexer 23 are processed by an inverse Fourier transform (OFDM) all together by the IFFT processor 24. FIG. 7 shows a multiplexed OFDM baseband signal. The OFDM baseband signal of ch1 is converted to a signal of a center frequency ($f_1-f_2$), the OFDM baseband signal of ch2 to a signal of a center frequency 0, and the OFDM baseband signal of ch3 to a signal of a center frequency ($f_3-f_2$), and the frequency converted signals are frequency-multiplexed.

The signal processed by an inverse Fourier transform at the IFFT processor 24 is inserted a guard interval by the guard interval inserter 25 and the result is output to the quadrature modulator 26.

The quadrature modulator 26 multiplies the input signal with a carrier wave of a frequency $f_{IF}$ generated by the oscillator 27 to carry out the quadrature-modulation and outputs the result to the frequency converter 28.

The frequency converter 28 multiplies the quadrature-modulated signal with the signal of a frequency ($f_2+f_{IF}$) generated by the oscillator 29 to convert it to a transmission frequency of the center frequency of $f_2$ to thereby transmit the RF band signal from the antenna 30.

In this way, by converting the frequency of the signal points of a plurality of information sequence in the frequency domain, to carry out the frequency multiplexing the same to thereby OFDM modulate them all at once, all modulated information sequence satisfy the orthogonal conditions of the OFDM, so there is no longer a need to provide the guard band which had been provided to prevent interference due to the adjacent channels and thereby it becomes possible to raise the efficiency of frequency utilization.

The RF band signal transmitted by the transmitter 20 is received and demodulated by a receiver 50 shown in FIG. 8. The signal transmitted by the transmitter 20, having the center frequency $f_2$, and comprised of the multiplexed three channels of ch1 to ch3 is received by an antenna 51 of the receiver 50. The signal received by the antenna 51 is input to a frequency converter 52.

The frequency converter 52 extracts the desired signal from the input signal by using a signal generated by an oscillator 53. The oscillator 53 supplies a signal with a frequency corresponding to the channel selected by the user to the frequency converter 52. That is, when the user selects the channel 1, a signal of a frequency ($f_1+f_{IF}$) is supplied to the frequency converter 52, when the channel 2, a signal of a frequency ($f_2+f_{IF}$), and when the channel 3, a signal of the frequency ($f_3+f_{IF}$). The frequency converter 52 converts the RF band signal to a signal of the intermediate frequency band by using a signal supplied from the oscillator 53 and outputs the result to a filter 54.

The filter 54 removes signals other than the signal corresponding to the channel selected by the user from the input signal converted to the intermediate frequency band and outputs the result to a quadrature demodulator 55. The quadrature demodulator 55 quadrature-demodulates the input signal by using a signal of an intermediate frequency $f_{IF}$ generated by an oscillator 56, extracts an I-signal and a Q-signal, and outputs them to an FFT processor 57. The FFT processor 57 carries out a Fourier transform (OFDM demodulation) on the input I-signal and Q-signal and outputs an information sequence corresponding to the channel selected by the user to a not shown display device etc.

In the above embodiment, the number of multiplexed channels was made three, but the invention is not limited to three channels. It is also possible to multiplex a further larger number of channels.

All or part of the signal processing of the above described transmitter 20 and/or receiver 50 can be achieved, for example, by realizing the transmitter 20 and/or receiver 50 by a computer and executing a signal processing program by the computer. Note that the "computer" includes a microcomputer, a high speed processing processor, for example, a digital signal processor (DSP), or other apparatus. This computer executes a signal processing program stored in a ROM or other storage medium. In this case, the ROM is a medium which provides a transmission processing program.

Of course, the signal processing of the aforementioned transmitter 20 and/or the receiver 50 may also be realized by only an electronic circuit or by a circuit comprised of a combination of an electronic circuit and a computer.

In the present specification, the providing medium for providing a user with a computer program for executing the above processing includes not only a magnetic disk, CD-ROM, or other data storage medium, but also transmission media using the Internet, digital satellites, and other networks.

INDUSTRIAL APPLICABILITY

As explained above, according to the transmission apparatus, transmission method, and providing medium as set forth in the present invention, information of N number of channels is assigned to signal points on a complex plane, the signal points are converted in frequency based on the center frequency of each channel, and the N number of signals are multiplexed and modulated to an OFDM signal, therefore it become possible to obtain a signal of a desired channel without being adversely affected by adjoining channels even without providing guard bands.

What is claimed is:

1. A transmission apparatus comprising:
   a plurality of assigning means for assigning independently a plurality of channel data to signal points on a complex plane;
   each assigning means having a mapping means for coding an input information sequence in accordance with a predetermined coding scheme and mapping the coded input information sequence onto signal points of an orthogonal coordinate space of a complex plane defined by an orthogonal I-axis and Q-axis;
   a plurality of frequency converting means for converting the frequency of the plurality of signal points output from said plurality of assigning means in response to a center frequency of each channel;
   a multiplexing means for multiplexing the plurality of signals output from said plurality of frequency converting means;
   a modulating means for modulating the signal multiplexed by the multiplexing means to an OFDM signal; and
   a transmitting means for converting the OFDM signal to an RF band signal and transmitting the same.

2. A transmission apparatus as set forth in claim 1, wherein each mapping means maps said input data in accordance with a QPSK or one of various QAM coding schemes.

3. A transmission apparatus as set forth in claim 2, wherein each frequency converting means converts the frequency according to a phase shift obtained by cumulatively adding a phase-shift angle based on an amount of shift between a center frequency of an RF band signal transmitted by said transmitting means and a center frequency of said channel and a guard interval length.

4. A transmission apparatus as set forth in claim 3, wherein
   each of said plurality of frequency converting means comprises
      a phase-shift angle generator for receiving as input the frequency shift and the guard interval length and generating a phase-shift angle defined by the input frequency shift and the guard interval length and effective symbol duration of an OFDM signal,
      an adder for adding a phase-shift angle generated by said phase-shift angle generator and a phase-shift angle preceding one OFDM signal, and
      a phase shifter for shifting a phase of the assigned signal from the corresponding assigning means in accordance with the added result from said adder.

5. A transmission apparatus as set forth in claim 4, wherein said phase-shift angle generator generates said phase-shift angle based on the following equation:

Phase-shift angle $\theta = 2\pi \Delta f (T + \Delta T)$ where,
   $\Delta f$ is the frequency shift,
   $\Delta T$ is the guard interval length, and
   T is the effective symbol duration of the OFDM signal.

6. A transmission apparatus as set forth in claim 5, wherein said phase shifter substitutes a phase-shift 2=input from said adder into the following equation to shift the phase of a signal point of the orthogonal coordinate space of said complex plane input from the assigning means and generate a frequency-converted signal point.

$$\begin{pmatrix} I' \\ Q' \end{pmatrix} = \begin{pmatrix} \cos\theta' & -\sin\theta' \\ \sin\theta' & -\cos\theta' \end{pmatrix} \begin{pmatrix} I \\ Q \end{pmatrix}.$$

7. A communication system comprising a transmission apparatus and a receiving apparatus connected wirelessly through a wireless channel, wherein
   said transmission apparatus comprises
      a plurality of assigning means for respectively and independently assigning a plurality of channel data to signal points on a complex plane,
      a plurality of frequency converting means for converting the frequency of the plurality of signal points output from said plurality of assigning means in response to a center frequency of each channel,
      a multiplexing means for multiplexing the plurality of signals output from said plurality of frequency converting means,
      a modulating means for modulating the signal multiplexed by the multiplexing means to an OFDM signal, and
      a transmitting means for converting the OFDM signal to an RF band signal and transmitting the same, and
   said receiving apparatus comprises
      a receiving means for receiving the signal transmitted from the transmitting means of said transmission apparatus;
      a frequency converting means for converting the signal received in the receiving means to a signal of an intermediate frequency;
      a frequency signal selecting means for extracting from the frequency converted signal only a frequency corresponding to the selected channel;
      a quadrature demodulating means for quadrature-demodulating the selected frequency signal by using an intermediate frequency signal and extracting an orthogonal I-signal and Q-signal defined in a complex coordinate system;
      a demodulating means for demodulating the quadrature-demodulated signal to a time-series signal.

* * * * *